(12) United States Patent
Patel

(10) Patent No.: US 9,013,298 B2
(45) Date of Patent: Apr. 21, 2015

(54) SYSTEM AND METHOD FOR PROVIDING LOCATION-BASED TRAINING INFORMATION

(75) Inventor: Umesh J. Patel, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1830 days.

(21) Appl. No.: 11/717,360

(22) Filed: Mar. 13, 2007

(65) Prior Publication Data

US 2008/0224853 A1 Sep. 18, 2008

(51) Int. Cl.
*G08B 1/08* (2006.01)
*G06Q 10/06* (2012.01)
*G09B 7/00* (2006.01)
*H04L 29/08* (2006.01)

(52) U.S. Cl.
CPC *G06Q 10/06* (2013.01); *G09B 7/00* (2013.01); *H04L 67/28* (2013.01)

(58) Field of Classification Search
USPC .................. 340/572.1, 10.1, 539.13; 380/258
See application file for complete search history.

(56) References Cited

U.S. PATENT DOCUMENTS

| | | | |
|---|---|---|---|
| 6,585,519 B1 * | 7/2003 | Jenkins et al. | 434/236 |
| 7,286,158 B1 | 10/2007 | Griebenow | |
| 2002/0006603 A1 * | 1/2002 | Peterson et al. | 434/365 |
| 2002/0026537 A1 * | 2/2002 | Schlabach et al. | 710/1 |
| 2003/0073065 A1 | 4/2003 | Riggs | |
| 2003/0217151 A1 | 11/2003 | Roese et al. | |
| 2005/0270158 A1 * | 12/2005 | Corbett, Jr. | 340/572.1 |
| 2006/0078122 A1 * | 4/2006 | Dacosta | 380/258 |
| 2006/0204948 A1 | 9/2006 | Sims | |

* cited by examiner

*Primary Examiner* — Shirley Lu

(57) ABSTRACT

Training information can be presented to a person based on that person's location. For example, a wireless device used by an employee or trainee can receive and present training information (such as an audio or video program) based on his or her location in an industrial facility or complex. The person's location can be tracked in any suitable manner, such as by using GPS, RFID, or other tracking technology. The person's location can also be determined at the wireless device or by an external system, such as the system providing the training information. When the person enters a particular area, such as a specified training area in an industrial facility or complex, the person's wireless device can receive training information tailored to that particular area of the industrial facility or complex.

10 Claims, 3 Drawing Sheets

SYSTEM AND METHOD FOR PROVIDING LOCATION-BASED TRAINING INFORMATION

TECHNICAL FIELD

This disclosure relates generally to training systems and more specifically to a system and method for providing location-based training information.

BACKGROUND

Processing and production facilities often include a large quantity of industrial equipment for producing or processing materials. Example processing and production facilities include manufacturing plants, chemical plants, crude oil refineries, and ore processing plants. These facilities are typically used to produce or process one or more products. The processing and production facilities could range from relatively simple arrangements of industrial equipment to large and highly complex arrangements of industrial equipment.

Operators of processing and production facilities typically need to train new employees or other personnel who work in the facilities. This training often involves teaching the personnel how to use or maintain the industrial equipment in a facility. This training is often important for several reasons. For example, the training may help to increase the speed and efficiency of the personnel in performing their work, which may translate into cost savings for the facility operator. The training may also help to improve safety within the facility, such as by teaching the personnel how to perform critical functions or how to avoid dangerous situations.

SUMMARY

This disclosure provides a system and method for providing location-based training information.

In a first embodiment, a method includes identifying a location associated with a person, where the person is associated with a wireless device. The method also includes identifying training information to be delivered to the wireless device, where the training information to be delivered is based on the location. In addition, the method includes communicating the training information to the wireless device.

In particular embodiments, identifying the location of the person includes using a tracking device associated with the person or the wireless device. The tracking device could represent a Radio Frequency Identification (RFID) tag. In other particular embodiments, identifying the location of the person includes receiving the location from the wireless device.

In still other particular embodiments, the location of the person is associated with a first training area, and the training information is provided to the wireless device after the person enters the first training area. Also, the method further includes identifying a second location associated with the person, identifying second training information to be delivered to the wireless device based on the second location, and communicating the second training information to the wireless device. The second location is associated with a second training area. The first and second training areas may represent different areas of an industrial facility or complex and be associated with different industrial equipment. The training information and the second training information may inform the person how to use or maintain the different industrial equipment.

In a second embodiment, an apparatus includes at least one memory operable to store training information. The apparatus also includes at least one processor operable to identify a location associated with a person, where the person is associated with a wireless device. The at least one processor is also operable to identify the training information to be delivered to the wireless device, where the training information to be delivered is based on the location. In addition, the at least one processor is operable to communicate the training information to the wireless device.

In a third embodiment, a system includes a plurality of transceivers operable to communicate with a wireless device and a database operable to store a collection of training information. The system also includes a training information distributor operable to identify a location associated with a person, where the person is associated with a wireless device. The training information distributor is also operable to identify training information to be delivered to the wireless device, where the training information to be delivered is based on the location. The training information distributor is further operable to communicate the training information to the wireless device.

In a fourth embodiment, a computer program is embodied on a computer readable medium. The computer program includes computer readable program code for identifying a location associated with a person, where the person is associated with a wireless device. The computer program also includes computer readable program code for identifying training information to be delivered to the wireless device, where the training information to be delivered is based on the location. In addition, the computer program includes computer readable program code for communicating the training information to the wireless device.

In a fifth embodiment, a method includes receiving training information at a wireless device, where the training information is based on a location of a person associated with the wireless device. The method also includes presenting the training information to the person using wireless device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
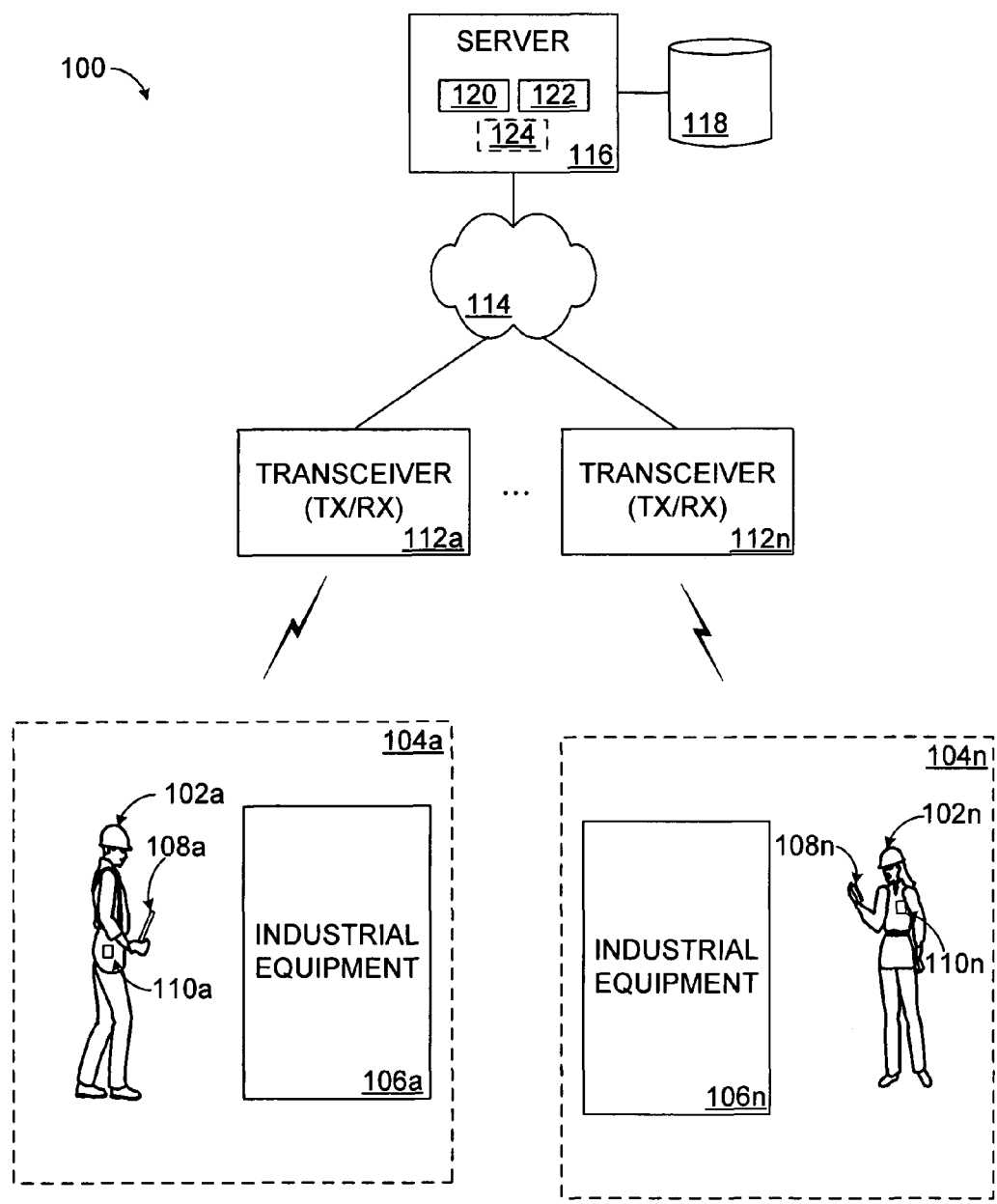
FIG. 1 illustrates an example system for providing location-based training information.

FIG. 1 illustrates an example system 100 for providing location-based training information. The embodiment of the system 100 shown in FIG. 1 is for illustration only. Other embodiments of the system 100 could be used without departing from the scope of this disclosure.

In this example embodiment, the system 100 tracks the location(s) of one or more personnel 102a-102n in an industrial facility or environment. For example, the system 100 may track the locations of multiple personnel 102a-102n as they move into and out of different areas 104a-104n of an industrial facility or complex. The different areas 104a-104n of the industrial facility or complex may include or be associated with different industrial equipment 106a-106n. Based on the locations of the personnel 102a-102n, the system 100 provides relevant training information (such as video programs) to wireless devices 108a-108n used by the personnel 102a-102n. The training information provided to the personnel 102a-102n varies depending on the identified locations of the personnel. In this document, the phrase "training information" refers to any content (such as audio, video, or graphical information) to be presented to one or more personnel to provide training to the personnel. Any suitable training could be supported, such as how to use or maintain the industrial equipment 106a-106n.

In this way, the system 100 can provide training information directly to the personnel 102a-102n while the personnel 102a-102n are in the industrial facility or complex. Moreover, the training information provided could be specific to the areas 104a-104n in which the personnel 102a-102n are located and/or the industrial equipment 106a-106n near the personnel 102a-102n. Among other things, this may help to provide more effective training for the personnel 102a-102n. For example, the personnel 102a-102n may be able to actually view and inspect the industrial equipment 106a-106n used in a particular facility or complex when the training information is being provided.

In this example, the areas 104a-104n could represent any portion of an industrial facility, complex, or other environment, such as a portion of a production or processing facility that produces or processes materials to form one or more products. The areas 104a-104n could, for example, represent areas of an industrial facility associated with different equipment. Also, the industrial equipment 106a-106n could represent any suitable equipment, devices, systems, or components thereof that perform any of a wide variety of functions in an industrial environment.

As shown in FIG. 1, the personnel 102a-102n use the wireless devices 108a-108n to receive training information. The wireless devices 108a-108n represent any suitable devices for receiving and presenting training information to the personnel 102a-102n. For example, the wireless devices 108a-108n could represent devices capable of receiving and presenting video and/or audio segments to the personnel 102a-102n. As particular examples, the wireless devices 108a-108n could include personal digital assistants, tablet computers, laptop computers, or any other or additional devices that can be used to present training information to the personnel 102a-102n.

The wireless devices 108a-108n could also be used to perform other functions. For example, the wireless devices 108a-108n could include location determination or tracking functionality. As particular examples, the wireless devices 108a-108n could be capable of determining their locations using Global Positioning System (GPS) or other techniques. In this way, the wireless devices 108a-108n could actively determine their locations and provide this information to the system 100. In other embodiments, the wireless devices 108a-108n could receive location information from an external source, such as by receiving location information from transceivers 112a-112n using Radio Frequency Identification (RFID) techniques. The wireless devices 108a-108n could then pass this location information to the system 100. In still other embodiments, the wireless devices 108a-108n could provide location information to an external source without determining their actual locations, such as by transmitting a beacon or other signal to the transceivers 112a-112n using RFID techniques. The beacon or other signal could be used by the system 100 to determine the locations of the wireless devices 108a-108n. In addition, the wireless devices 108a-108n could lack location determination or tracking functionality altogether, and the system 100 could use other techniques to identify the locations of the personnel 102a-102n. For instance, the personnel 102a-102n could wear or carry tracking devices 110a-110n, such as RFID tags or other tracking devices. The tracking devices 110a-110n could also be attached to other objects, such as the wireless devices 108a-108n. The system 100 could track the locations of the personnel 102a-102n using the devices 110a-110n.

Figure 2:
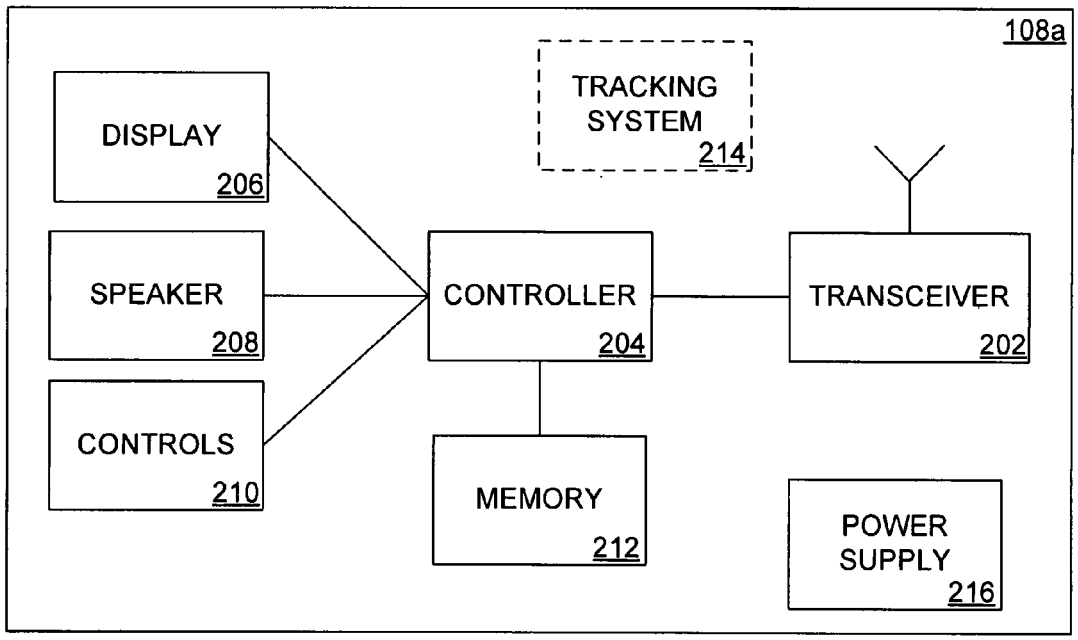
FIG. 2 illustrates an example wireless device for receiving location-based training information.

Each of the wireless devices 108a-108n includes any suitable device for presenting training information to a user. One example embodiment of a wireless device is shown in FIG. 2, which is described below. Although shown in FIG. 1 as using different types of wireless devices, the same type of wireless device could be used in the system 100. Each of the tracking devices 110a-110n includes any suitable device for providing information for tracking an object. However, one, some, or all of the personnel 102a-102n may not use or carry a tracking device (such as when the wireless devices 108a-108n provide tracking information).

In this example embodiment, training information is provided to the personnel's wireless devices 108a-108n using the transceivers 112a-112n, a network 114, a server 116, and a database 118. The transceivers 112a-112n facilitate wireless communication with the personnel's wireless devices 108a-108n. For example, the transceivers 112a-112n could receive requests for training information from the wireless devices 108a-108n and provide the training information to the wireless devices 108a-108n. The transceivers 112a-112n could support any suitable wireless communication scheme, such as radio frequency (RF) communications.

In some embodiments, the transceivers 112a-112n also support personnel tracking functions in the system 100. For example, the transceivers 112a-112n could detect beacon signals or other signals from the wireless devices 108a-108n or the tracking devices 110a-110n. The beacon signals or other signals could be initiated by the wireless devices 108a-108n or the tracking devices 110a-110n or in response to polling signals or other signals received from the transceivers 112a-112n. The transceivers 112a-112n could then pass this information to the server 116. The identity of a transceiver receiving a signal from a wireless device or tracking device could be used to identify the actual or estimated location of that wireless device or tracking device.

In other embodiments, the transceivers 112a-112n could transmit beacon signals or other signals to the wireless devices 108a-108n. The wireless devices 108a-108n can include the identity of one or more transceivers 112a-112n in a request for training information. The server 116 could use the information in the request to identify the location of a wireless device and to provide the appropriate training information to the wireless device.

In still other embodiments, the transceivers 112a-112n are not used to identify the locations of the wireless devices 108a-108n. Rather, the wireless devices 108a-108n may be capable of determining their own positions, such as by using GPS. In these embodiments, the transceivers 112a-112n could be used to receive requests for training information from the wireless devices 108a-108n and to provide the training information to the wireless devices 108a-108n.

Each of the transceivers 112a-112n includes any suitable structure for transmitting information to and/or receiving information from the wireless devices 108a-108n. Although shown as transceivers in FIG. 1, the transceivers 112a-112n could be divided into transmitters and receivers as appropriate.

The network 114 facilitates communication between various components in the system 100. For example, the network 114 may communicate Internet Protocol (IP) packets, frame relay frames, Asynchronous Transfer Mode (ATM) cells, or other suitable information between network addresses. The network 114 may include one or more local area networks (LANs), metropolitan area networks (MANs), wide area networks (WANs), all or a portion of a global network such as the Internet, or any other communication system or systems at one or more locations.

The server 116 selects and provides training information to the wireless devices 108a-108n. For example, the server 116 could receive requests for training information from the wireless devices 108a-108n, identify the locations of the wireless devices 108a-108n, and select appropriate training information for the wireless devices 108a-108n based on their locations. The server 116 could use any suitable technique for identifying the locations of the wireless devices 108a-108n, such as by using location information provided by the wireless devices 108a-108n themselves or information provided by other components (such as the tags 110a-110n or the transceivers 112a-112n). In other embodiments, the server 116 could automatically provide training information to the wireless devices 108a-108n based on the identified locations of the wireless devices 108a-108n. In these embodiments, the server 116 need not receive requests for training information from the wireless devices 108a-108n before providing the training information to the wireless devices 108a-108n. The server 116 could provide training information to the wireless devices 108a-108n in any suitable manner, such as by streaming a video program to the wireless devices 108a-108n or communicating a compressed video program to the wireless devices 108a-108n for storage, decompression, and presentation.

The server 116 includes any suitable device for providing training information to one or more wireless devices 108a-108n. In this example, the server 116 includes one or more processors 120 and one or more memories 122 capable of storing data and instructions used, collected, and generated by the processors 120 (such as training information). As a particular example, the server 116 could include one or more applications 124 executed by the processor(s) 120. The applications 124 could, for example, represent one or more computer programs for identifying the location of a wireless device, selecting training information associated with that location, and outputting the selected training information.

The database 118 stores training information for one or more industrial facilities, complexes, or other environments. For example, the database 118 could store video programs, audio programs, or other training information associated with different areas 104a-104n of one or more production or processing facilities. The database 118 represents any hardware, software, firmware, or combination thereof capable of storing and facilitating retrieval of information. The database 118 may also use any of a variety of data structures, arrangements, and compilations to store and facilitate retrieval of information. While shown as residing outside of and being coupled directly to the server 116, the database 118 could reside in any location or locations accessible by the server 116.

Although FIG. 1 illustrates one example of a system 100 for providing location-based training information, various changes could be made to FIG. 1. For example, the layout and arrangement of the system could vary, and any number of personnel, areas, wireless devices, tracking devices, transceivers, networks, servers, and databases could be used or supported. Also, components could be combined or omitted and additional components could be added in the system 100 according to particular needs. Further, while shown as a server computer in FIG. 1, the functionality of the server 106 could be implemented in any suitable device or system, such as a desktop computer, laptop computer, or other content distribution device or system. In addition, while described as being used to present training information associated with an industrial facility, the system 100 could be used to provide training information associated with any other type of environment.

FIG. 2 illustrates an example wireless device 108a for receiving location-based training information. The embodiment of the wireless device 108a shown in FIG. 2 is for illustration only. Other embodiments of the wireless device 108a could be used without departing from the scope of this disclosure. Also, for ease of explanation, the wireless device 108a of FIG. 2 is described as being used in the system 100 of FIG. 1. The wireless device 108a could be used in any suitable system to provide any suitable training information.

As shown in FIG. 2, the wireless device 108a includes a transceiver 202. The transceiver 202 allows the wireless device 108a to communicate and exchange information with an external system, such as by allowing wireless communication with the transceivers 112a-112n. For example, the transceiver 202 may allow the wireless device 108a to transmit a request for training information to the server 116 via one or more of the transceivers 112a-112n. The transceiver 202 may also allow the wireless device 108a to receive training information from the server 116 via one or more of the transceivers 112a-112n. The transceiver 202 represents any suitable interface supporting wireless communications, such as an RF transceiver.

The wireless device 108a also includes a controller 204. The controller 204 controls the overall operation of the wireless device 108a. For example, the controller 204 can generate a request for training information and provide the request to the transceiver 202 for wireless communication. The controller 204 could also receive, process, and output training information for presentation to a user. The controller 204 includes any hardware, software, firmware, or combination thereof for performing various operations in the wireless device 108a. The controller 204 could, for example, represent a microprocessor, digital signal processor, application specific integrated circuit (ASIC), or field programmable gate array (FPGA).

The training information received by the wireless device 108a could be presented to the user in any suitable manner. For example, the training information could be presented to the user using a display 206 and/or a speaker 208. The display 206 includes any suitable structure for presenting video or graphical information to a user, such as a liquid crystal display (LCD). The speaker 208 includes any suitable structure for presenting audio information to the user.

In this example, the wireless device 108a further includes one or more controls 210. The controls 210 could be used by a user to provide inputs to the controller 204, which could use the inputs to control the operation of the wireless device 108. The one or more controls 210 include any suitable structure(s) allowing the user to control or adjust the operation of the wireless device 108a, such as buttons, a keyboard, or a keypad. The controls 210 could also support any suitable functions in the wireless device 108a. For example, the controls 210 may allow the user to initiate or stop presentation of training information by the wireless device 108a. The controls 210 may also allow the user to replay or skip a portion of the training information or pause the presentation of the training information. The controls 210 could further allow the user to request additional training information, to provide requested or needed information to the server 116, or to perform any other or additional function.

A memory 212 is coupled to the controller 204. The memory 212 stores various information used, generated, or collected by the wireless device 108a. For example, the memory 212 could store instructions and data used by the controller 204 to perform various functions, such as a computer program executed by the controller 204. The memory 212 could also store training information received from the server 116 via one or more transceivers 112a-112n. The training information could be stored, presented to the user, and then discarded. The training information could also be stored for a longer period of time, such as until the training information is requested by the user or until the next set of training information is received from the server 116. The memory 212 could store any other or additional information, such as statistics generated by the controller 204. The statistics could, for example, identify the amount of time that a user spends watching or listening to the training information and whether the user paused, muted, or skipped any of the training information. These or other or additional statistics could be used to ensure that users are complying with given instructions, such as by ensuring that trainees are actually listening to the training information. The memory 212 includes any suitable volatile and/or non-volatile storage and retrieval device or devices.

In this example, the wireless device 108a optionally includes a tracking system 214. The tracking system 214 may allow the wireless device 108a or an external system to identify the location of the wireless device 108a. This may allow, for example, the external system to provide appropriate training information to the wireless device 108a. The tracking system 214 may use any suitable technique to identify the location of the wireless device 108a or to facilitate identification of the wireless device's location by an external device or system. As examples, the tracking system 214 could represent a GPS tracking system capable of identifying a location of the wireless device 108a using the GPS satellite system. The tracking system 214 could also represent an RFID system that communicates with external RFID components, such as the transceivers 112a-112n. In these embodiments, the tracking system 214 could receive signals identifying the current location of the wireless device 108a, or the tracking system 214 could initiate transmission of signals (such as beacon signals) that are used by an external system to identify the location of the wireless device 108a. Any beacon or other signals transmitted by the wireless device 108a could be initiated by the tracking system 214 in any suitable manner, such as at a specified interval or in response to receiving paging signals.

The tracking system 214 may use any suitable tracking scheme, such as GPS, Ultra Wide Band, active or passive RFID, low power Wireless Fidelity (WIFI), or any other tracking technology. The tracking system 214 includes any suitable structure facilitating identification of the location of the wireless device 108a, whether the identification occurs within or outside of the wireless device 108a. In some embodiments, the controller 204 could assist the tracking system 214 in identifying the location of the wireless device 108a, such as by analyzing signals received by the tracking system 214. In other embodiments, the location of the wireless device 108a can be determined using other information (such as the location of a tracking device 110a-110n), and the tracking system 214 can be omitted from the wireless device 108a or deactivated.

In addition, the wireless device 108a includes a power supply 216. The power supply 216 supplies power to various components in the wireless device 108a. The power supply 216 could represent any suitable source of operating power, such as a battery or other power source.

Although FIG. 2 illustrates one example of a wireless device 108a for receiving location-based training information, various changes may be made to FIG. 2. For example, the wireless device 108a could include any number of each individual component, such as multiple displays or memories. Also, the functional division shown in FIG. 2 is for illustration only. Various components in FIG. 2 could be combined or omitted and additional components could be added according to particular needs. As a particular example, the tracking system 214 and transceiver 202 could be combined into a single wireless system for transmitting requests for information, receiving training information, and transmitting or receiving beacon signals. As another particular example, the controller 204 could form part of or be integrated with the tracking system 214 and perform various functions related to the identification of the wireless device's location.

Figure 3:
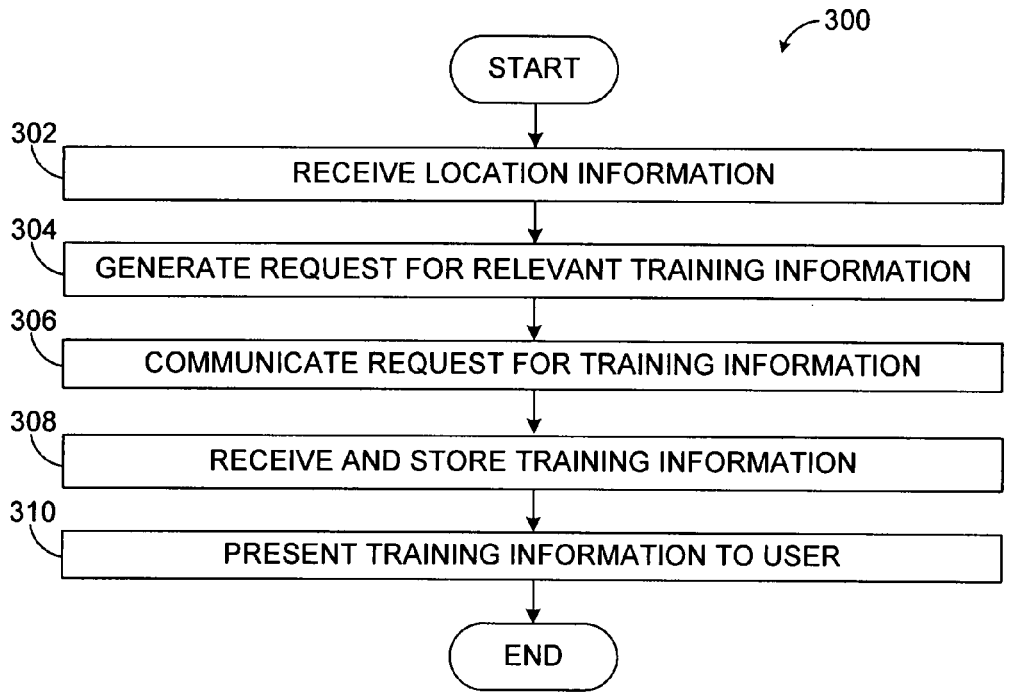
FIG. 3 illustrates an example method for receiving location-based training information.

FIG. 3 illustrates an example method 300 for receiving location-based training information. The embodiment of the method 300 shown in FIG. 3 is for illustration only. Other embodiments of the method 300 could be used without departing from the scope of this disclosure. Also, for ease of explanation, the method 300 is described with respect to the wireless device 108a of FIG. 2 operating in the system 100 of FIG. 1. The method 300 could be used by any suitable device and in any suitable system.

The wireless device 108a receives location information associated with the wireless device 108a at step 302. This could include, for example, the tracking system 214 identifying the actual location of the wireless device 108a, such as by using GPS or RFID. This could also include the tracking system 214 identifying paging or beacon signals from a transceiver in the system 100, where the identified signals are related to the location of the wireless device 108a. Any other or additional technique could be used to identify the location of the wireless device 108a.

The wireless device 108a generates a request for training information at step 304. This could include, for example, the controller 204 generating a request for training information and including the identified location of the wireless device 108a in the request. The wireless device 108a communicates the request for the training information at step 306. This could include, for example, the controller 204 providing the generated request to the transceiver 202, which communicates the request to the server 116 via one or more of the transceivers 112a-112n.

The wireless device 108a receives and stores training information at step 308. This could include, for example, the transceiver 202 receiving the training information from the server 116 via one or more of the transceivers 112a-112n. The training information can be stored in the memory 212. The wireless device 108a provides the training information to the user at step 310. This may include, for example, the controller 204 retrieving the training information from the memory 212 and rendering and providing the training information to the display 206 and/or the speaker 208. Depending on the implementation, the controller 204 may need to decompress or decrypt the training information before storing the training information in the memory 212 or before the training information is provided to the user.

Although FIG. 3 illustrates one example of a method 300 for receiving location-based training information, various changes may be made to FIG. 3. For example, the wireless device 108a may not need to identify its location or send its location to the server 116, and step 302 could be omitted. Also, the wireless device 108a could automatically receive the training information (such as when the wireless device 108a enters a particular area 104a-104n), and steps 304-306 could be omitted. In addition, the method 300 could be repeated multiple times, such as when the wireless device 108a moves from one training area to another.

Figure 4:
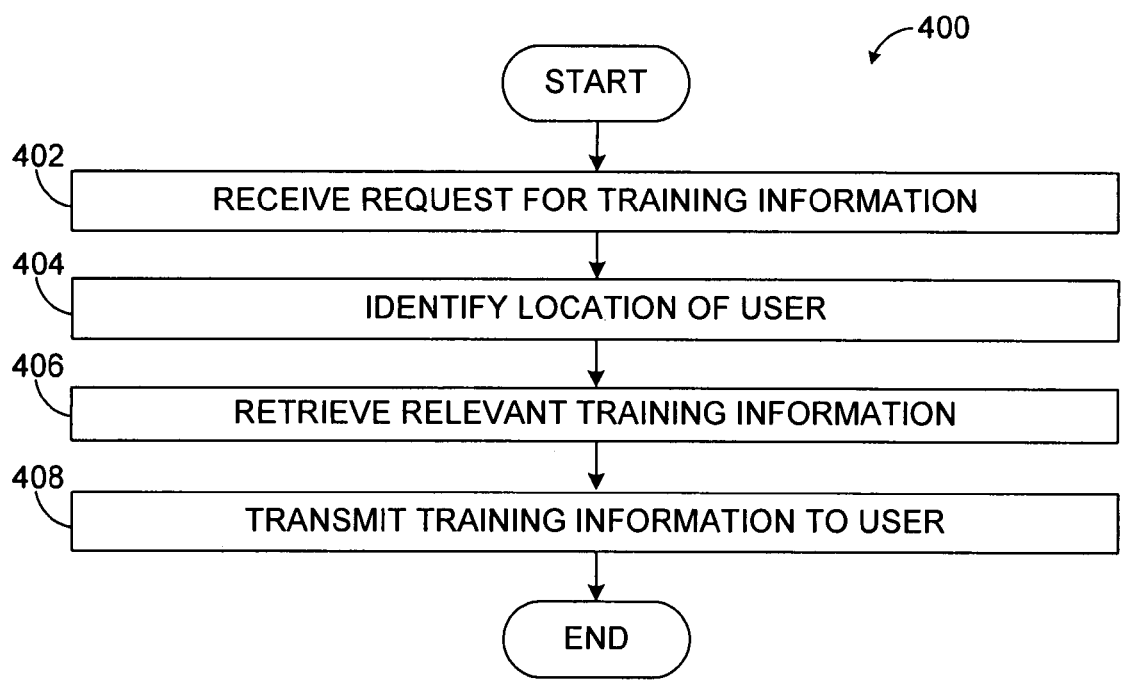
FIG. 4 illustrates an example method for providing location-based training information.

FIG. 4 illustrates an example method 400 for providing location-based training information. The embodiment of the method 400 shown in FIG. 4 is for illustration only. Other embodiments of the method 400 could be used without departing from the scope of this disclosure. Also, for ease of explanation, the method 400 is described with respect to the server 116 operating in the system 100 of FIG. 1. The method 400 could be used by any suitable device and in any suitable system.

The server 116 receives a request for training information at step 402. This could include, for example the server 116 receiving the request from a wireless device 108a via one or more of the transceivers 112a-112n and the network 114. The request may or may not include the location of the wireless device 108a.

The server 116 identifies an actual or approximate location of the wireless device at step 404. This could include, for example, the server 116 identifying the location of the wireless device 108a using information contained in the request. As particular examples, the request could contain GPS coordinates or the identity of a transceiver that transmitted a beacon signal received by the wireless device 108a. This could also include the server 116 identifying the location of the wireless device 108a using information outside of the request. As particular examples, this could include the server 116 using the location of a tracking device 110a-110n or the identity of the transceiver that received the request for training information. Any other or additional technique could be used to identify the location of the wireless device 108a.

The server 116 retrieves relevant training information for the wireless device at step 406. This could include, for example, the server 116 retrieving a subset of the training information from the database 118, where the retrieved training information deals with industrial equipment 106a-106n in the area 104a-104n in which the wireless device 108a is located.

The server 116 provides the retrieved training information to the wireless device at step 408. This could include, for example, the server 116 providing the retrieved training information in compressed form or as a streaming program to the wireless device 108a via the network 114 and one or more of the transceivers 112a-112n.

Although FIG. 4 illustrates one example of a method 400 for providing location-based training information, various changes may be made to FIG. 4. For example, the server 116 could automatically provide the training information to the wireless device 108a (such as by detecting when the wireless device 108a enters a particular area 104a-104n), and step 402 could be omitted. Also, the wireless device 108a could select and request the training information to be received based on its location, and step 406 could involve retrieving the specific training information requested by the wireless device 108a. In addition, the method 400 could be repeated multiple times, such as when the wireless device 108a moves from one training area to another.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
identifying a location associated with a person, the person associated with a wireless device;
identifying training information to be delivered to the wireless device from a collection of training information based on the location;
communicating the identified training information to the wireless device;
monitoring statistics related to presentation of the identified training information on the wireless device; and
using the statistics to ensure that the person is receiving the identified training information by monitoring an amount of time that the wireless device spends displaying the identified training information and whether the wireless device mutes or skips playback of any of the identified training information.

2. The method of claim 1, wherein identifying the location of the person comprises using a tracking device associated with the person or the wireless device.

3. The method of claim 2, wherein the tracking device comprises a Radio Frequency Identification (RFID) tag.

4. The method of claim 1, wherein identifying the location of the person comprises receiving the location from the wireless device.

5. The method of claim 1, wherein monitoring the statistics comprises recording when the person pauses the identified training information.

6. The method of claim 1, wherein:
the location of the person is associated with a first training area; and
the identified training information is provided to the wireless device after the person enters the first training area.

7. The method of claim 5, further comprising:
using the statistics to ensure that the person is complying with the identified training information.

8. The method of claim 6, further comprising:
identifying a second location associated with the person, the second location associated with a second training area;
identifying second training information to be delivered to the wireless device based on the second location; and
communicating the identified second training information to the wireless device;
wherein the first and second training areas comprise different areas of an industrial facility or complex; and
wherein the first and second training areas are associated with different industrial equipment.

9. The method of claim 8, wherein the identified training information and the identified second training information inform the person how to use or maintain the different industrial equipment.

10. The method of claim 1, wherein the identified training information comprises audio, video, or graphical content.

* * * * *